Patented Feb. 6, 1934

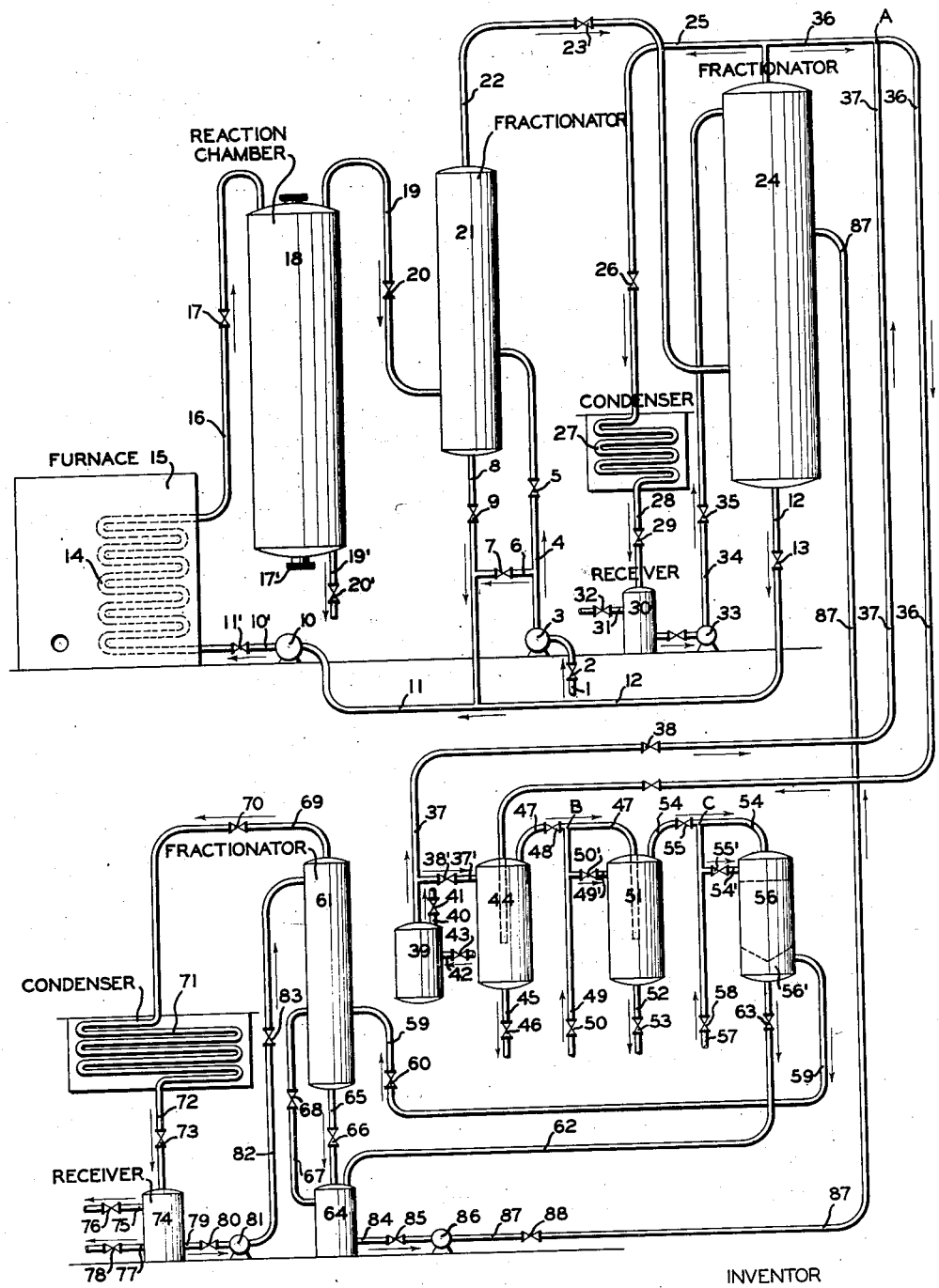

1,946,131

UNITED STATES PATENT OFFICE 1,946,131

TREATMENT OF HYDROCARBON OILS

Richard F. Davis, Chicago, Ill., assignor to Universal Oil Products Company, Chicago, Ill., a corporation of South Dakota Application February 11, 1931. Serial No. 514,920

20 Claims. (Cl. 196—36)

This invention relates to the treatment of hydrocarbon oils and refers more particularly to the treatment of vapors of such oils of approximately gasoline boiling point range to produce controllable refining effects.

More specifically the invention contemplates the introduction into hydrocarbon vapors of approximately the boiling point range desired, of vaporous treating agents typified by, for example, sulfur trioxide either alone or in admixture with other gases or vapors, the provision of means for separating the products of the ensuing vapor phase reaction by settling and/or filtering and finally rectifying the treated vapors by subsequent fractionating devices.

In a specific and preferred embodiment of the invention vapors of boiling point range approximating that desired in the finished gasoline of a cracking plant are treated prior to their condensation with dry gaseous sulfur trioxide or analogous gases either alone or mixed with inert diluent gases or vapors which serve to modify the nature and extent of the reactions produced. The sludge or mixture of heavy tarry or resinous reaction products is caused to settle in a succeeding zone, the emergent vapors neutralized when necessary by the addition of alkaline gases such as ammonia or caustic soda sprays, the liquid products of the neutralization again settled, the treated and neutralized vapors finally freed from suspended reaction products by passage thru adsorbent or filtering material and the vapors fractionated to produce liquids of desired boiling point range and refinement. The elements in the cracking equipment may consist of a tubular heating element, an enlarged reaction zone, combinations of fractionating devices serving to produce intermediate stocks for retreating in the cracking zone and desired end point vapors to be treated by the addition of acid vapors as disclosed. To control the boiling point range of the vapors to be subjected to the refining treatment auxiliary condensing equipment may be provided for producing untreated liquids of approximate boiling point range for recirculation to the top of the final fractionator.

To enable a description of an example of operation comprised within the scope of the invention reference is made to the attached drawing which shows diagrammatically an arrangement of apparatus adapted to carrying out some of its aims and objects. Raw oil is taken by pump 3 from line 1 containing valve 2 and pumped either through line 4 containing valve 5 or through line 6 containing valve 7, the division of the flow being adjusted to suit the needs of the particular stock used and the products desired. Line 4 discharges into fractionator 21 wherein the charging oil contacts with the products from the reaction zone thereby effecting an interchange of heat and assisting in fractionation of the products and also the elimination of lighter portions of the charging oil than may be effectively treated in the cracking reaction zone. The liquefied portions of the reaction products from fractionator 21 are returned through line 8 containing valve 9 and combined in line 11 with a portion of the charging stock, line 11 leading to pump 10 which discharges into line 10' and valve 11' and into heating element 14. During the passage of the combined feed through this heating element heat and pressure are employed in a degree sufficient to induce desired reactions and the products of this heating are discharged through line 16 containing valve 17 into reaction chamber 18 wherein further conversions are effected, the reaction chamber being preferably well insulated to prevent loss of heat. Heating element 14 is disposed in any suitable furnace 15. Reaction chamber 18 is provided with line 19' containing valve 20' for the removal of liquid products and manhead 17' for the removal of coke if the process is conducted under conditions tending toward its formation. The vapors from the reaction chamber pass through line 19 containing valve 20 into fractionator 21 wherein preliminary separation of vapor and liquid reaction products is effected, the vapors passing through line 22 containing valve 23 to another fractionator 24 which may be preferably of the bubble tray type. Provision is made in line 12 containing valve 13 for the return of reflux condensate from this fractionator to heating element 14 along with similar but generally higher-boiling fractions from fractionator 21. To enable accurate control of the boiling-point range of vapors emerging from fractionator 24 an auxiliary condenser is provided. A suitable portion of the vapors may be caused to flow through line 25 containing valve 26 to auxiliary condenser 27 and the cooled and partially liquefied products then pass through line 28 containing valve 29 to receiver 30. Line 31 containing valve 32 allows the release of accumulations of gases in receiver 30. The liquid condensing in receiver 30 is taken by pump 33 and discharged through line 34 containing valve 35 to the top of fractionator 24 to effect the control of boiling point range desired. The vapors from fractionator 24 leaving through line 36 are those to be treated to produce gasoline of improved quality.

At a point A in vapor line 36 treating reagents typified by dry sulfur trioxide vapor are introduced from line 37 containing valve 38. Generator 39 is shown to indicate any means for vaporizing treating agents either by heat or other means, line 42 containing valve 43 being provided for the admission of treating agents to the generator and line 40 containing valve 41 being shown as a means of releasing excess pressure. Line 37' containing valve 38' allows admission of treating reagents directly to chamber 44 if desired, in which the reactions following their introduction may be more or less completed. Liquid products that may settle in chamber 44 may be removed through line 45 containing valve 46, these products being generally of a pitch-like nature resembling the heavy acid sludges produced in various petroleum refining operations. As a means of eliminating possible corrosion effects chamber 44 may be constructed of anti-corrosion metals such as chromium or other alloy steels or may be lined with such metals or other metals, for example, lead. The vapors emerging from chamber 44 through line 47 containing valve 48 may retain traces of compounds of an acidic nature such as sulfur trioxide, and means are provided by line 49 containing valve 50 for introducing at a point B vapors or liquids of a basic nature such as ammonia gas or alkaline solutions for the neutralization of these acidic constituents. Such neutralizing gases or liquids may also be introduced directly into chamber 51 through line 49' containing valve 50'. The neutralized vapors then enter settling chamber 51 and means are provided in line 52 containing valve 53 for the removal of reaction products which may accumulate therein. Vapors emerge from chamber 51 through line 54 containing valve 55 and enter chamber 56, means being provided at point C for the introduction from line 57 containing valve 58 of further reagents which may be advantageous in the completion of the desired reactions. For example, a natural gas or similar mixtures of hydrocarbon gases may be introduced to vary the velocity of the gaseous mixture passing thru chamber 56 or steam may be introduced either as a washing agent or a means of cleaning materials that may be used in chamber 56. Means are also provided by line 54' containing valve 55' to allow such reagents to be added directly to chamber 56, which contains preferably some form of relatively finely divided catalytic or adsorbent material serving to complete the reactions previously induced and entrain products, which may settle in liquid form in space 56'. As examples of filtering materials which may be used to effect the substantially complete removal of the products of the treatment from the vapors prior to their final rectification may be mentioned inert materials such as clays, sands, crushed rock, fuller's earth, metal filings, etc. The treated hydrocarbon vapors from chamber 56 pass thru line 59 containing valve 60 to fractionator 61 which typifies a suitable device which may be used for the final rectification of the vapors and may be preferably of the bubble tray type of fractionating column. The liquefied products from chamber 56' pass thru line 62 containing valve 63 to receiver 64 which also receives thru line 65 containing valve 66 such liquids as condense in fractionator 61. Provision is made by line 67 containing valve 68 for the equalization of pressure between receiver 64 and fractionator 61 so that gas lock cannot occur. The vapors from fractionator 61 pass through line 69 containing valve 70 to condenser 71, the condensed products passing through line 72 containing valve 73 to receiver 74. Fixed gases from receiver 74 are released through line 75 containing valve 76 and treated hydrocarbons of gasoline boiling point range may be removed to storage by means of line 77 containing valve 78. Suitable amounts of the liquid in receiver 74 are taken through line 79 containing valve 80 by pump 81 and pumped through line 82 containing valve 83 to control the boiling point range of vapors emerging from fractionator 61. The liquid condensate in receiver 64 is taken through line 84 containing valve 85 by pump 86 and pumped preferably through line 87 containing valve 88 to a point in fractionator 24 although the point of reintroduction of these liquid products into the system is optional within the scope of the invention. Pressure employed will vary generally with the nature of the products to be treated and may range from 100 to 400 lbs. more or less in the cracking reaction zone. Temperatures employed in the exit of heating element 14 may be of the order of from 850 to 1000° F. In general the pressures in succeeding portions of the apparatus will be differential at succeeding points to insure proper flow conditions. The temperature, pressure and other conditions employed in the cracking process to produce vapors for treatment within the scope of the invention may vary within any ranges suitable for the treatment of the raw oils processed and any type of cracking equipment of greater or less effectiveness may be employed.

As a means of moderating and controlling the vaporous reactions and at times of assisting in the volatilization of the reagents more or less inert gases such as hydrogen, methane or light hydrocarbon gases may be used along with the treating vapors. When sulfur trioxide is used the reaction products will vary from organic compounds of the nature of sulfones thru sulfoxides to compounds resulting from the complete reduction of the acid radical. Owing to the absence of moisture except in the negligible amounts that may be produced by the interaction of the oxygen in the treating vapors with hydrogen in the hydrocarbon molecules, the complete utilization of the reagents employed and the generally neutral character of the reaction products, corrosion effects are reduced to a minimum. There will also be produced condensed and polymerized products of a more or less asphaltic or pitchy nature as a result of the action of oxygen upon unsaturated hydrocarbons present in the hydrocarbon vapors treated, these depositing during the passage of the vapors through the treating chambers and ultimately removed during the passage of the treated vapors through the filtering chamber at the end of the series. It is evident from the description that a process has been disclosed which has as one of its principal objects the production of gasoline equivalent to that commonly produced by treating and rerunning operations by conducting the treating prior to the cooling and condensing of the gasoline fractions, this resulting in the conservation of heat and the elimination of a great deal of costly equipment.

In one example of the operation of the process of the invention a 30 gravity gas oil produced in the primary distillation of a crude oil typical of the Mid-Continent producing area is cracked at a temperature of 935° F. at the exit of the heating element of the cracking unit and a pressure of 250 lbs. per sq. in. in the reaction chamber, the pressure being reduced between the first and second fractionating towers to approximately 60 lbs. per sq. in. By maintaining a temperature of 375° F. at the top of the second fractionating tower there is produced for treatment a mixture of hydrocarbon vapors with an end point of 415° F. with a yield of 65% on a basis of the gas oil charged, this gasoline having a gravity of 56° A. P. I., a gum content of approximately 300 mg. per 100 cc. as determined by the copper dish method and a color on the Saybolt chromometer scale of about 12, this color deepening to a pale yellow upon a few hours' exposure to sunlight. By injecting sulfur trioxide at an equivalent rate of approximately 2 lbs. per bbl. of finished gasoline into the vapors and passing them after settling and neutralizing through 30 to 60 mesh earth, the gasoline produced has a gravity of 56.5° A. P. I., the color is 30 on the Saybolt scale, this dropping to only 25 on 4 hrs. exposure to sunlight and the gum content is reduced to 20 mgs. The loss in yield is less than 1% as a result of the treatment. The sulfur content of this finished gasoline is found to be .05% compared to a value of .20% without the treatment described.

I claim:

1. The method of treating the dephlegmated gasoline vapors of a hydrocarbon oil cracking process which comprises contacting the dephlegmated cracked gasoline vapors with dry sulphur trioxide, separating the heavy reaction products thus formed, and finally condensing the treated vapors.

2. The method of treating the dephlegmated gasoline vapors of a hydrocarbon oil cracking process which comprises contacting the dephlegmated cracked gasoline vapors with dry sulphur trioxide, separating the heavy reaction products thus formed, neutralizing the vapors by treatment with alkali, passing the neutralized vapors through adsorbent earth, and then rectifying and condensing the vapors.

RICHARD F. DAVIS.